United States Patent [19]
Clewes et al.

[11] Patent Number: 5,992,717
[45] Date of Patent: Nov. 30, 1999

[54] FISHING ROD HOLSTER

[76] Inventors: Donald Clewes, 1055 Bloor Street, East, #717, Mississauga, Ontario, Canada; Paul J. Uhrig, 1140 Brookside, Franklin, Tenn. 37069

[21] Appl. No.: 08/984,896

[22] Filed: Dec. 4, 1997

[51] Int. Cl.⁶ .................................................. A45F 5/00
[52] U.S. Cl. .................. 224/251; 224/200; 224/673; 224/271; 224/584; 224/922; 43/21.2
[58] Field of Search ...................... 224/922, 191, 224/192, 197, 198, 199, 200, 660, 673, 676–679, 251, 255, 269, 271, 272, 584; D22/147; 43/21.2; 248/530, 532, 220.41, 220.42, 220.43, 221.12

[56] References Cited

U.S. PATENT DOCUMENTS

| | | | |
|---|---|---|---|
| 1,597,734 | 8/1926 | Sousa, Jr. ................................ | 224/922 |
| 2,139,188 | 12/1938 | Haislip .................................... | 224/200 |
| 2,670,111 | 2/1954 | Stahle ...................................... | 224/922 |
| 2,954,909 | 10/1960 | Miller et al. ............................. | 224/200 |
| 3,021,101 | 2/1962 | Gliebe ...................................... | 224/922 |
| 3,252,638 | 5/1966 | Rolston et al. ........................... | 224/192 |
| 3,339,869 | 9/1967 | Andersen ................................. | 248/532 |
| 3,749,294 | 7/1973 | Johnston .................................. | 224/200 |
| 3,750,918 | 8/1973 | Jensen . | |
| 3,874,573 | 4/1975 | Fruscella et al. . | |
| 3,885,721 | 5/1975 | Vanus . | |
| 3,917,134 | 11/1975 | Tumlinson . | |
| 4,569,466 | 2/1986 | Webber . | |
| 4,802,612 | 2/1989 | Anderson ................................. | 224/922 |
| 5,018,653 | 5/1991 | Shoemaker .............................. | 224/193 |
| 5,024,018 | 6/1991 | Ferrigno .................................. | 43/21.1 |
| 5,123,578 | 6/1992 | Morse . | |
| 5,265,781 | 11/1993 | Nichols ................................... | 224/198 |
| 5,349,775 | 9/1994 | Monderas ................................ | 43/21.2 |
| 5,386,932 | 2/1995 | Gross ...................................... | 224/200 |
| 5,511,336 | 4/1996 | Bishop .................................... | 431/21.2 |
| 5,520,312 | 5/1996 | Maddox .................................. | 224/607 |
| 5,639,057 | 6/1997 | Yeomans ................................. | 248/530 |
| 5,813,162 | 9/1998 | Tse et al. ............................. | 224/200 X |

*Primary Examiner*—Gregory M. Vidovich
*Attorney, Agent, or Firm*—Waddey & Patterson; I. C. Waddey, Jr.

[57] ABSTRACT

A reversible fishing rod holster comprising a hip plate and a tube configured to receive a fishing rod. The hip plate includes at least one slot configured to enable a hip plate to be attached to a belt. The hip plate further includes at least one aperture configured to receive at least one fastener attached to the tube for removably attaching the tube to the hip plate. The tube receives the handle end of the fishing rod, securing it for hands free fishing. The tube includes at least one fastener for removable attachment to the hip plate. The tube further includes an inner sleeve configured to house an extendible spike. The spike may be extended and secured in the ground, allowing the user to move away from the water. The holster includes at least one fastener to secure the spike in place. The holster is reversibly configured for attachment to the right or left side of the user's belt, for right and left-handed use.

20 Claims, 8 Drawing Sheets

FISHING ROD HOLSTER

BACKGROUND OF THE INVENTION

The present invention relates generally to fishing equipment and more particularly to holsters for holding a fishing rod. Generally one thinks of a fisherman as standing by a body of water holding a fishing rod in his hands. In reality, a fisherman spends much of his time struggling to hold his fishing rod under his arm or braced on the ground while baiting the hook or removing his catch. Many of the tasks involved in fishing are difficult, if not impossible, to accomplish while at the same time holding a fishing rod. Placing a fishing rod on the ground is not a preferred solution as it may result in a snagged or tangled line, dirt in the reel mechanism or even a fish catching the rod instead of the rod catching a fish. While there are several patents for fishing rod holders that are designed to be hung from a belt, the fishing rod holster of the present invention is preferable over other fishing rod holders found in the art because it allows the user to position the holster on either side of his or her body as well as providing a means for securing the rod in the ground.

U.S. Pat. No. 3,874,573 issued Apr. 1, 1975, to Fruscella et al, discloses a one piece fishing rod holster with slots for attachment to a belt and has loops with which to hold the fishing rod. One drawback associated with the Fruscella et al, device is that the holster is not reversible such that it may be worn on the left or right side, nor does it include a retractable spike to allow for securing the fishing rod in the ground.

U.S. Pat. No. 5,511,336 issued Apr. 30, 1996, to Bishop describes a fishing holder with a hip plate and a cylindrical tube for holding the fishing rod. The tube is attached such that it angles to the side and away from the body. However, this configuration does not position the rod in front of the fisherman's body for easy access to the line, nor does it allow the fisherman to anchor the rod in the ground or position the rod on either side of his or her body.

U.S. Pat. No. 4,569,466 issued Feb. 11, 1986, to Webber discloses a fishing rod holster that includes a base having slots for accepting the fisherman's belt. The holster has rigid support loops hingedly mounted to the base portion to support the rod. However, the Webber device does not enable a user to wear the holster on either side of the body nor does it offer a means for securing the rod in the ground.

What is needed, then, is a device to hold the fishing rod in a manner approximating the way a fisherman would hold the rod for himself, such that the fisherman's hands are free and the rod is positioned in a manner that would allow the fisherman to continue fishing or to bait the hook or to remove a catch. Such a device would be reversible, such that the same holster might be worn on either the left or right side of the body, and would further provide a means for securing a fishing rod in the ground to further free the hands of the fisherman.

SUMMARY OF THE INVENTION

The present invention is directed to a fishing rod holster which can be worn on either side of the body and which can also be used to stabilize the fishing rod in the ground. The holster has slots for attachment to a belt and is designed to allow the user to maintain a rod in a position similar to the position he would hold the rod in himself, at an angle between vertical and horizontal, and slightly in front of the body. This position allows the user easy access for working with the fishing line. The holster also has keyholes for the attachment of the receptacle, preferably a tube, which is used to hold the fishing rod. The holster is made of a flexible material to facilitate the threading of the belt from either side of the plate to accommodate use on the left and right sides of the user's body.

The tube attachment receives the handle portion of the rod and may be constructed of any suitable material, such as plastic, composites, metal and the like. The tube is detachable, with fasteners on the outside to slide in the keyhole cutouts and secure the tube to the hip plate. The tube has a retractable spike which is secured in a sleeve inside the tube while the holster is being worn and which can be extended from the tube such that when the tube is removed from the hip plate, the spike can be secured in the ground and the fishing rod placed in the tube. The tube has two thumbscrews for use in holding the spike in place, either stored inside the tube or locked in position outside the tube. The spike attachment enables the fisherman to secure his rod should it become necessary to move away from the bank or shore while fishing, or even fish with more than one rod at a time.

The present invention may therefore be summarized in a variety of ways, one of which is the following: A reversible fishing rod holster, comprising a hip plate having opposing sides and a front edge and configured for attachment to a belt to be worn about a user's body with said front edge extending in the direction the user is facing when the holster is being worn by the user, a tube for receiving the handle end of a fishing rod, attaching fasteners for attaching the tube to the hip plate so that the tube can be positioned on either side of the hip plate, thereby enabling the holster to be worn on either side of a user's body with the tube extending in a predetermined orientation relative to the front edge of the hip plate when the hip plate is on one side of the user's body, and extending in the same predetermined orientation relative to said front edge of the hip plate when the holster is worn on the opposite side of a user's body. The holster further comprising a spike housed within the tube, and means for enabling said spike to be operable between a retracted position and an extended position whereby said tube can be anchored to a ground surface by removing said tube from said hip plate and extending said spike from said tube and driving said spike into a ground surface. The attachment means comprises at least one aperture formed in the hip plate and at least one fastener attached to the tube where the at least one aperture is configured to cooperatively receive at least one fastener attached to the tube. The attachment means further comprises a second fastener attached to the tube and a slot having a plurality of notches for receiving said second fastener to enable the tube to be attached to the hip plate in any of a plurality of user selectable positions. The invention also includes a holster, as defined above, wherein the spike is housed, when in the retraced position, in a longitudinal bore formed in a wall of the tube. Alternatively, the invention includes the holster defined above wherein the spike is housed within a longitudinal sleeve formed along an inner surface of the tube. The holster defined above also can include means for securing the spike in either the retracted position or the extended position. Further, the invention can include the holster defined above wherein the securing means comprises an axial bore formed in the tube and at least one screw threadably received in said axial bore, wherein the at least one screw may be tightened to bear against the spike or loosened to enable the spike to be extended or retracted. The holster defined above also includes wherein the hip plate with a pair of spaced apart elongated slots for receiving a belt.

Yet another way of summarizing the invention is: a reversible holster for a fishing rod, comprising a hip plate configured for attachment to a belt said hip plate having opposing sides, a receptacle for receiving the fishing rod, means for removably attaching the receptacle to the hip plate to enable the receptacle to be attached to one side of the hip plate or removed and attached to the opposite side of the hip plate thereby enabling said holster to be positioned on either the right side or the left side of the belt. The aforesaid holster may also include at least one fastener attached to the receptacle and a plurality of apertures formed in the hip plate, wherein said plurality of apertures is configured to receive said at least one fastener attached to the receptacle to enable the receptacle to be attached to the hip plate in any of a plurality of user selectable positions. The holster of this invention may further have as a feature a spike housed within the receptacle, wherein the spike is operable between a retracted position and an extended position to enable the receptacle to be anchored to a ground surface. The holster may have the spike received in a longitudinal bore formed in a wall of the receptacle when in the retracted position. The means for securing the spike may be integral with the means for attaching the receptacle to the hip plate.

A third way of summarizing the invention is: a fishing rod holster including a hip plate having means for attaching the plate to a belt, a tube having spaced apart open ends and means for attaching the tube to the hip plate, an elongated spike having a body and an enlarged head wherein the diameter of the head is greater than the diameter of the body of the spike, a sleeve inside the tube having means for securing the spike in position, wherein the spike is contained within the sleeve within the tube and can be slidably moved within the sleeve in a manner that permits the spike to be secured in a retracted position inside the tube or extended from the same, wherein the sleeve member includes a stop means for preventing the spike from becoming disengaged from the sleeve. The hip plate is constructed of a material selected from the group of materials consisting of plastic, leather or rubber. The tube is constructed of a material selected from the group of materials consisting of plastic, rubber, metal, composites, leather or wood. The means for securing the spike may be integral with the means for attaching the tube to the hip plate. The holster is reversible in a manner that allows the holster to be attached on either side of the user's body. The tube is removably detachable from the holster, allowing for the removal of the tube and the extension of the spike for insertion into the ground.

It is an object of the present invention to provide a fishing rod holster that securely holds a fishing rod, thus freeing the hands of the user.

It is yet another object of the present invention to provide a holster to allow the user to more easily work with a fishing rod.

It is yet another object of the present invention to provide a holster that is reversible and may be worn on either side of the user's body.

It is yet another object of the present invention to allow the user to secure a fishing rod in the ground.

DESCRIPTION OF THE PREFERRED EMBODIMENTS

Figure 1:
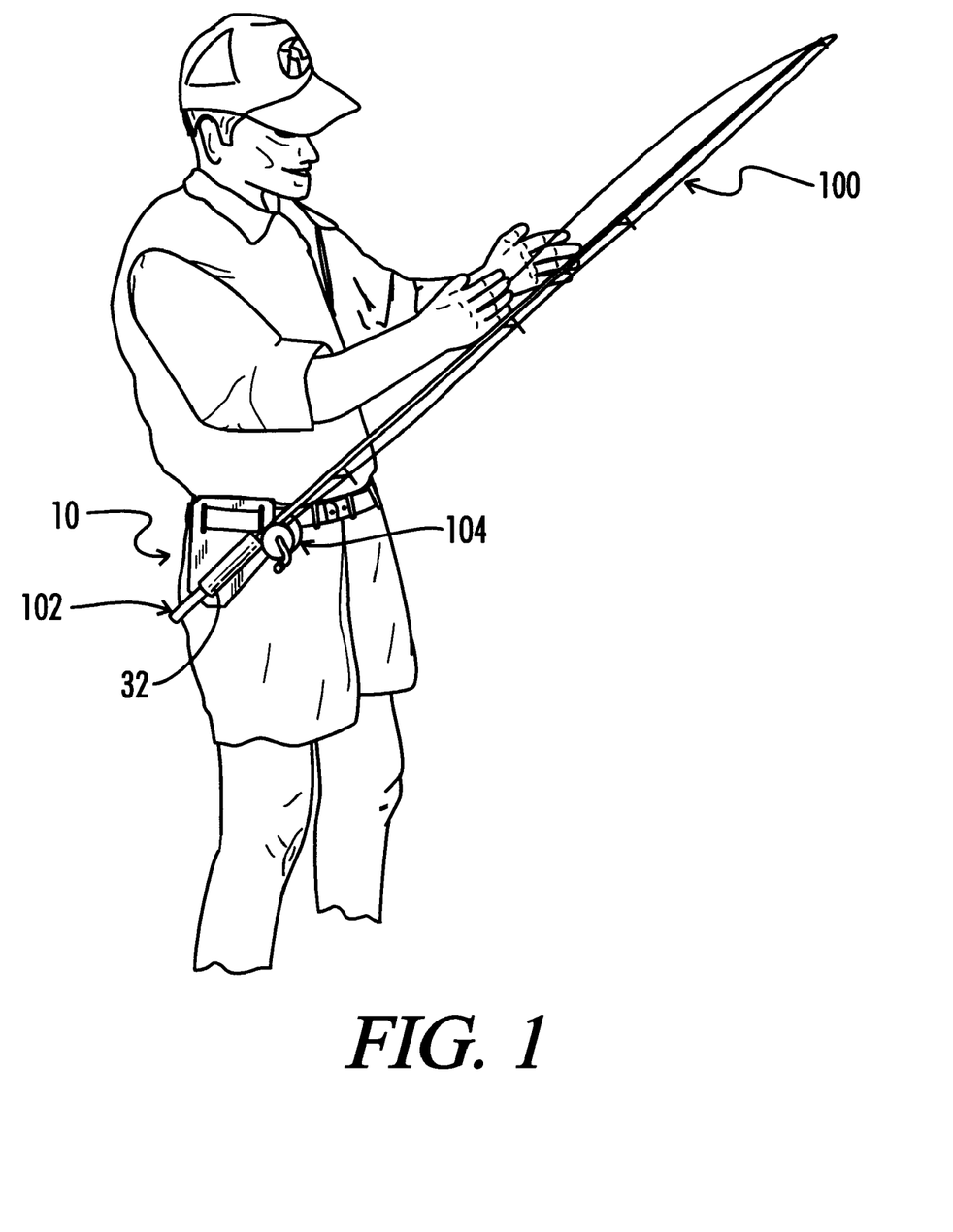
FIG. 1 is a perspective view of the fishing rod holster of the present invention shown in an operable position on the belt of a user with a fishing rod positioned therein.

With reference to FIG. 1, a fisherman is shown using the fishing rod holster 10 of the present invention to hold a fishing rod 100 while he works with the line. This view clearly illustrates how the holster 10 is used to position the rod 100 at an angle between thirty and sixty degrees from vertical and in front of the user's body for convenient access. FIG. 1 also illustrates the manner in which the handle portion 102 of the rod 100 is received in the tube 14 up to the point at which the reel assembly 104 is attached to the rod 100. Although a cylindrically shaped tube is used in the preferred embodiment, it is contemplated to be within the scope of the present invention that receptacles of other configurations might be used, including a tube with four sides, or an octagonally shaped tube.

Figure 2:
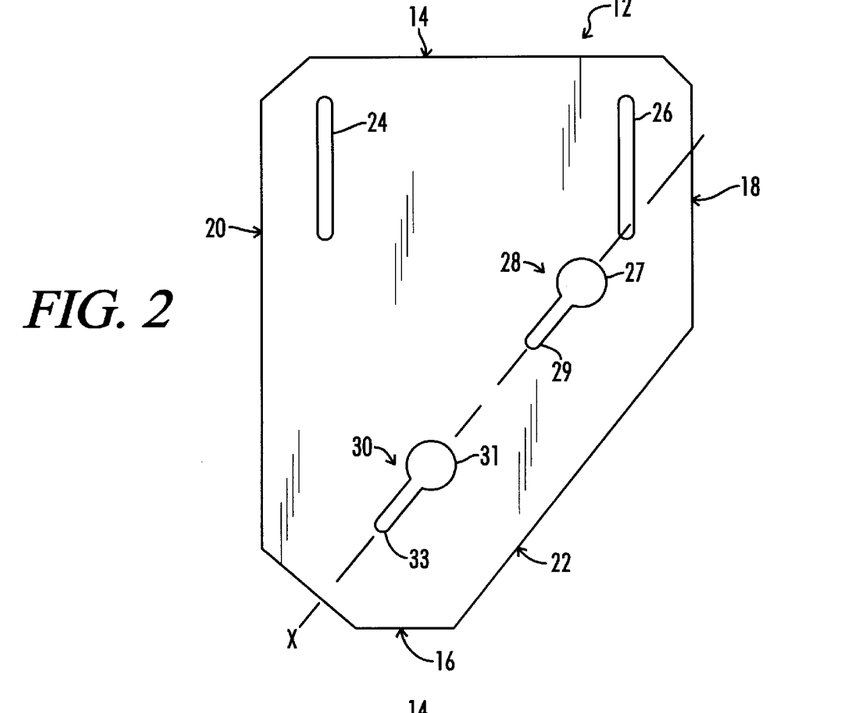
FIG. 2 is a front view of the hip plate of the present invention shown without the tube portion attached.

With reference to FIG. 2, the configuration of the hip plate 12 is shown. The hip plate 12 comprises a reversible piece of flexible material with cutouts to accommodate various attachment requirements. In the preferred embodiment, the plate 12 comprises a plurality of edges, including a top 14, bottom 16, front 18, back 20 and angled front edge 22. The top portion of the hip plate 12 includes two elongated slots 24, 26 to facilitate attachment of the plate 12 to the user's belt. The slots 24, 26 are positioned proximate the top edge 14 of the plate in a spaced apart arrangement, with one slot 26 proximate the front edge 18 of the plate and one slot 28 proximate the back edge 20. The slots 24, 26 are configured to accommodate a variety of belt sizes. Accordingly, a belt may be threaded through the slots 24, 26 for attachment of the holster 10 thereto.

FIG. 2 also shows the means for attachment of the tube 32 portion of the holster 10. The tube 32 is attached to the plate 12 by means of the keyhole cutouts 28, 30 situated along an axis X parallel to the front angled edge 22 of the hip plate 12. Axis X may be oriented at an angle between thirty and sixty degrees from vertical. In the preferred embodiment, the tube 32 is positioned at an angle of forty-five degrees from vertical. Each of the keyholes 28, 30 includes a circular portion 27, 31 and a slot portion 29, 33. In this manner, the heads 35, 37 of a pair of fasteners 34, 36 attached to the tube 32 may be inserted into the circular portions 27, 31.

Figure 12A:
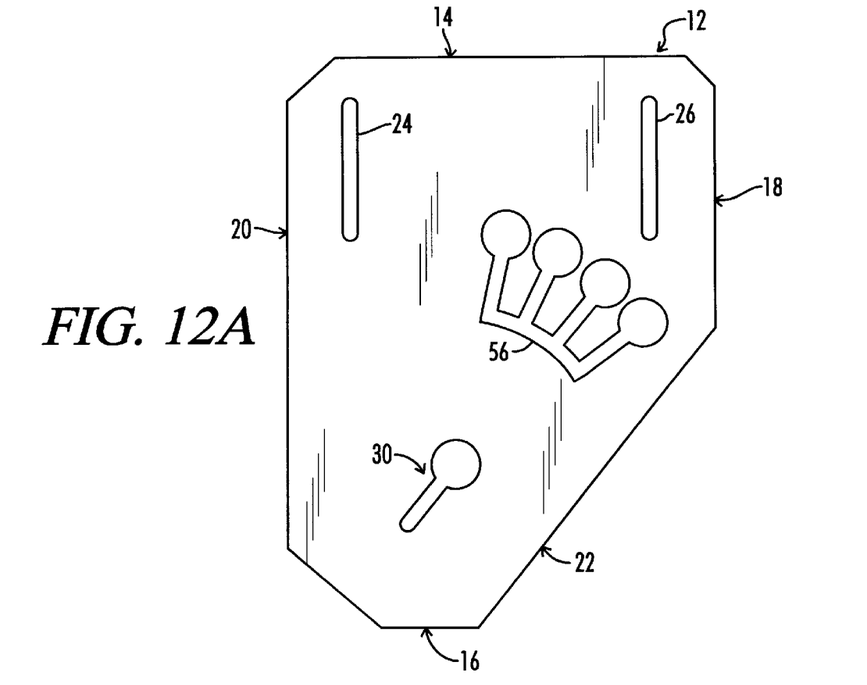
FIG. 12A is a front view of the holster of the present invention configured for right-handed attachment, with a slot with multiple notches.
Figure 12B:
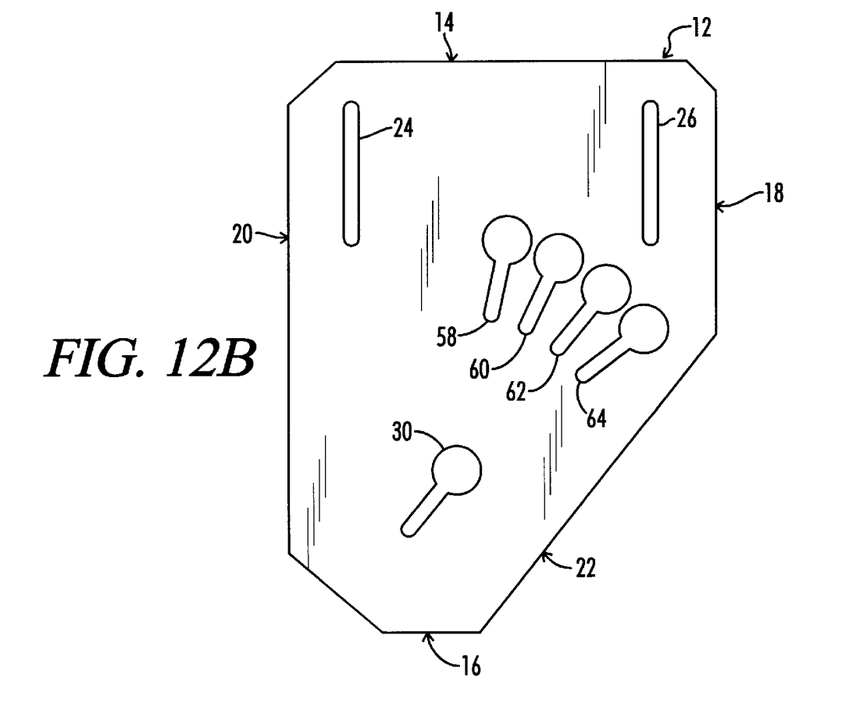
FIG. 12B is a front view of the holster of the present invention configured for right-handed attachment, with a plurality of slots.

It is anticipated that alternate embodiments of the present invention would include a hip plate 12 configured to allow the user to adjust the angle of the rod 100 in the holster. FIG. 12A shows an alternative embodiment of the hip plate 12 with the slot 56 proximate to the front edge 18 including a plurality of notches to allow for adjustment of the angle of the rod 100. FIG. 12B shows yet another alternate hip plate 12 allowing for angle adjustment, in which the slot 56 with multiple notches shown in FIG. 12A is replaced by multiple keyhole slots 58, 60, 62, 64.

Figure 3:
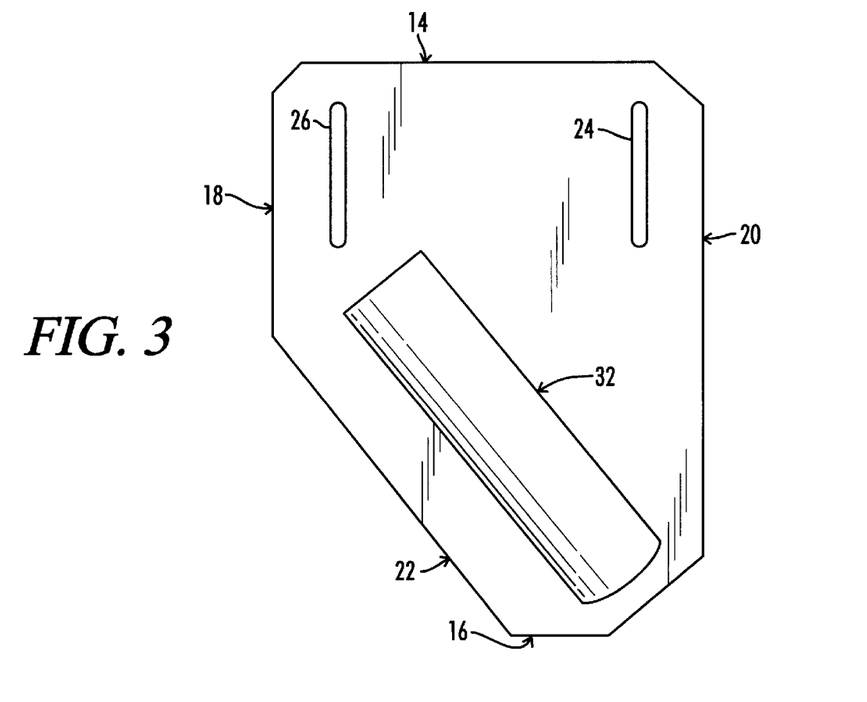
FIG. 3 is a front view of the holster of the present invention configured for left-handed attachment.

With reference to FIG. 3, there is shown a front view of the holster 10 positioned to be worn on the left side of the body. The tube 32 is shown attached so that it is on the side of the plate 12 opposite the user's body. This figure also shows the position of the tube 32 when it is attached to the holster. In the preferred embodiment, the tube 32 is positioned on the plate 12 at an angle that is approximately 45 degrees from vertical, which is substantially parallel to the angled front edge 22 of the plate 12, and is angled toward the front of the holster 10 and the front of the user.

Figure 4:
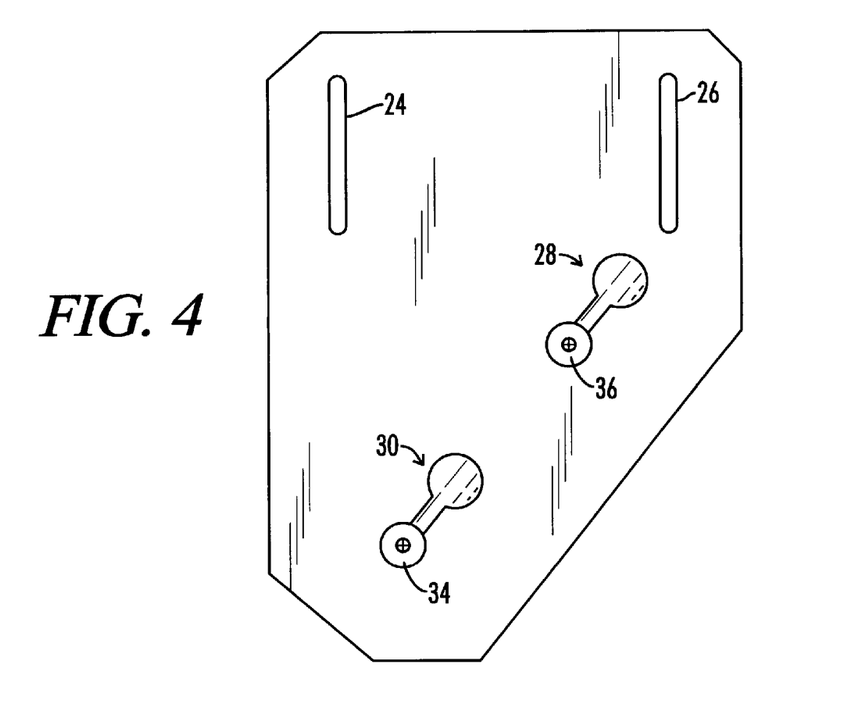
FIG. 4 is a rear view of the holster shown in FIG. 3.

With reference to FIG. 4, a rear view of holster 10 is shown with the tube 32 attached for wearing on the left side of the body. The heads 35, 37 of the fasteners 34, 36 protrude from the keyholes 28, 30 when the tube 32 is seated on the hip plate 12 of the holster 10. When the fasteners 34, 36 are seated in this manner, the tube 32 is secured to the hip plate 12 in a position for holding the rod 100.

Figure 5:
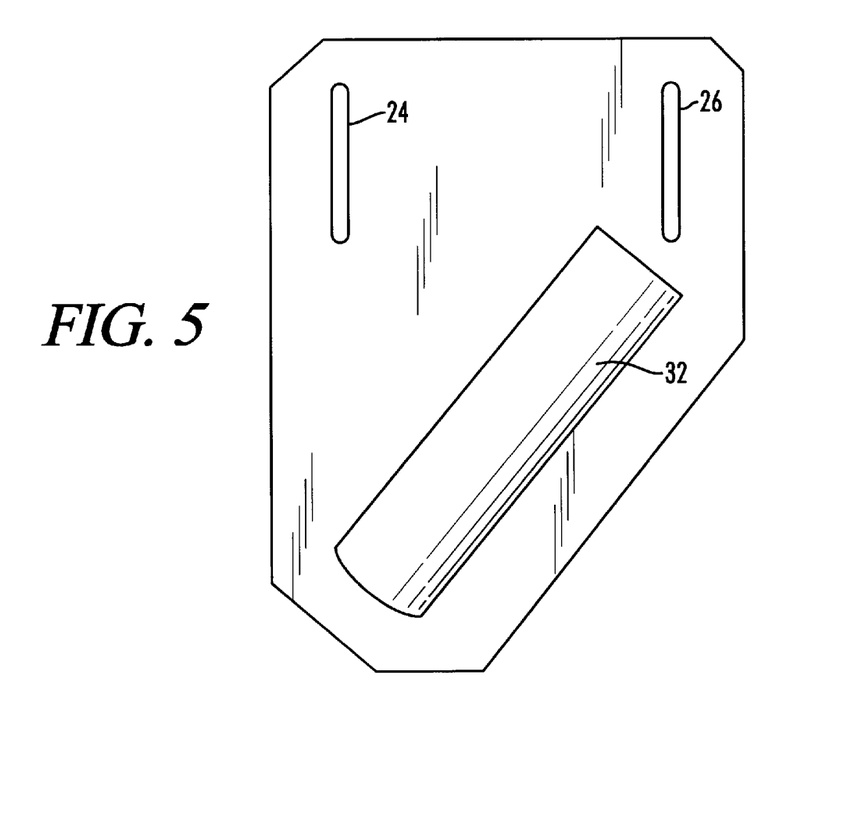
FIG. 5 is a front view of the holster of the present invention configured for right-handed attachment.

With reference to FIG. 5, a front view of the holster 10 is shown, with the holster 10 fitted for wearing on the right side of the body. One of the advantages of the holster 10 of the present invention is that the components may be assembled for attachment on either side of the body. The user must simply attach the tube 32 to the appropriate side of the plate 12. The tube 32 is easily attached by inserting the fasteners 34, 36 into the circular portion 27, 31 of the keyhole cutouts and sliding the fasteners 34, 36 down into the slotted portion 29, 33 so that the tube 32 is seated in the hip plate 14.

Figure 6:
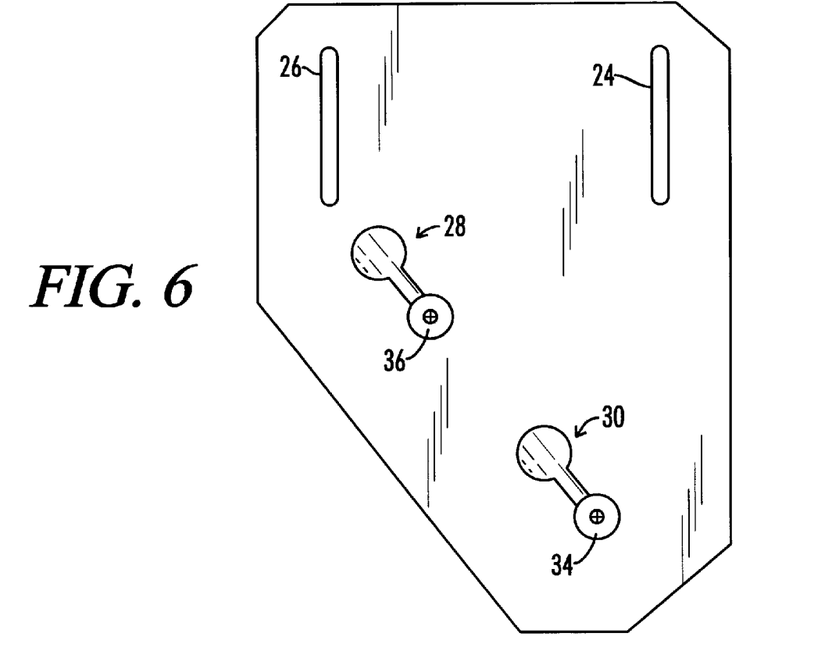
FIG. 6 is a rear view of the holster shown in FIG. 5.

With reference to FIG. 6, there is shown a rear view of the holster 10 fitted for wearing on the right side of the body. The heads 35, 37 of the tube fasteners 34, 36 protrude from the keyholes 28, 30 where the tube 32 is seated on the hip plate 12 of the holster.

Figure 7A:
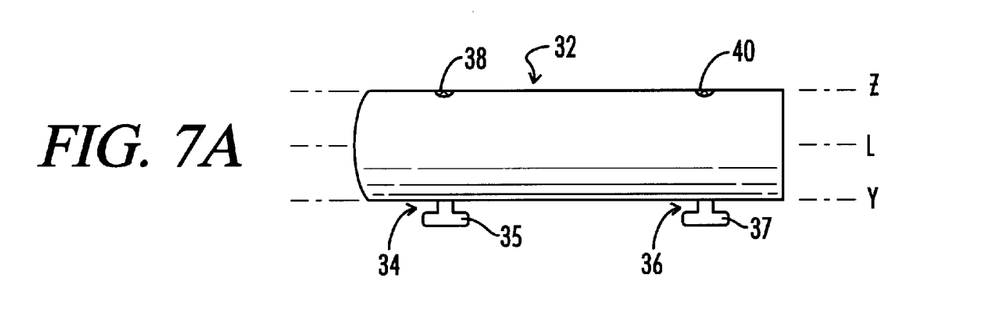
FIG. 7A is a side view of the tube portion of the holster of the present invention which shows the fasteners in profile.

With reference to FIG. 7A, the tube 32 used to hold the rod 100 in the holster 10 is shown, with a pair of fasteners 34, 36 and a pair of thumbscrews 38, 40 shown in profile, with thumbscrew 38 at tube end 42 and thumbscrew 40 at tube end 44. The tube 32 comprises a hollow cylinder having spaced apart open ends. The fasteners 34, 36 and the thumbscrews 38, 40 are preferably positioned on opposite sides of the tube 32, and are aligned along axes Y and Z that are parallel to a longitudinal axis L of the tube 32. Alternatively, the fasteners 34, 36 and the thumbscrews 38, 40 may be located on axes in any other spaced apart manner about the circumference of the tube 32. It is also contemplated that the thumbscrews 38, 40 or other means for retaining the spike 48 be incorporated into the fasteners 34, 36 such that separate retaining means, i.e. thumbscrews, are not required. Each of the fasteners 34, 36 comprises a shank and an enlarged head 35, 37. Accordingly the heads 35, 37 of the fasteners 34, 36 may be inserted through the circular ends 27, 31 of the keyhole cutouts 28, 30, and the fasteners 34, 36 moved to a position in which the heads 35, 37 protrude from an opposite side of the hip plate 12 and the shanks are seated in the slot portions 29, 33 to secure the tube 32 in place.

Figure 7B:
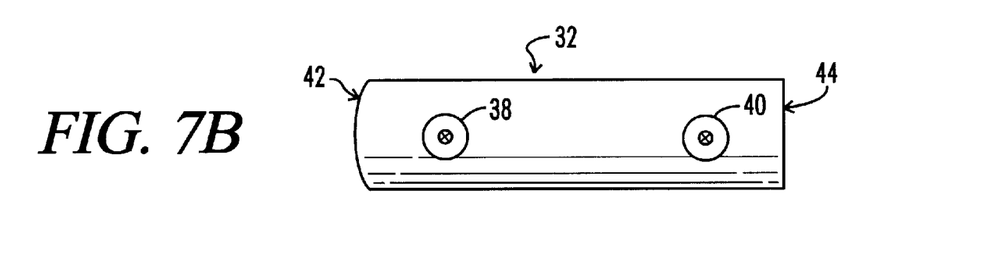
FIG. 7B is an alternate side view of the tube portion shown in FIG. 7A.

With reference to FIG. 7B, there is shown a side view of the tube 32 rotated ninety degrees from the position of the tube 32 shown in FIG. 7A to illustrate the preferred positioning of the fasteners 34, 36 in a spaced relation to one another along axis Y.

Figure 8A:
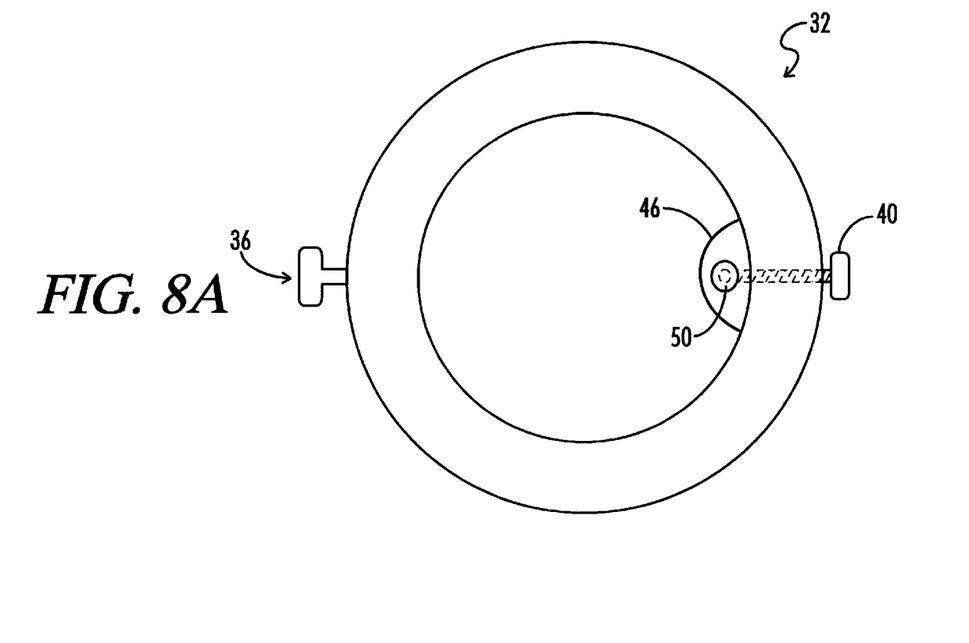
FIG. 8A is an end view of the tube portion of the present invention.
Figure 8B:
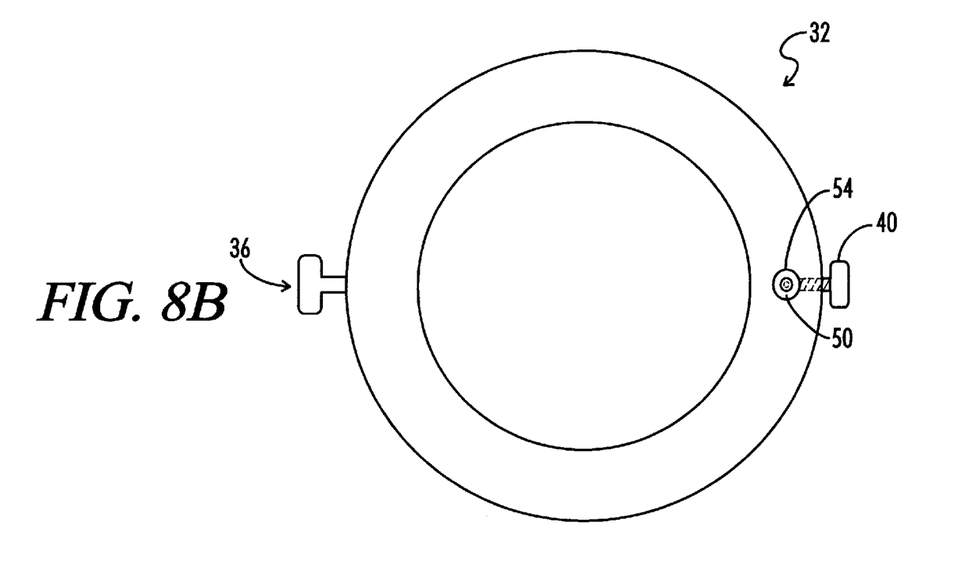
FIG. 8B is an end view of an alternate embodiment of the tube portion of the present invention.

With reference to FIG. 8B, there is shown an alternate embodiment of the present invention in which the spike 48 is retracted into a longitudinal bore 54 formed in the wall of the tube 32. The thumbscrews 38, 40 are positioned in the same manner for securing the spike 48 in the desired position.

Figure 9A:
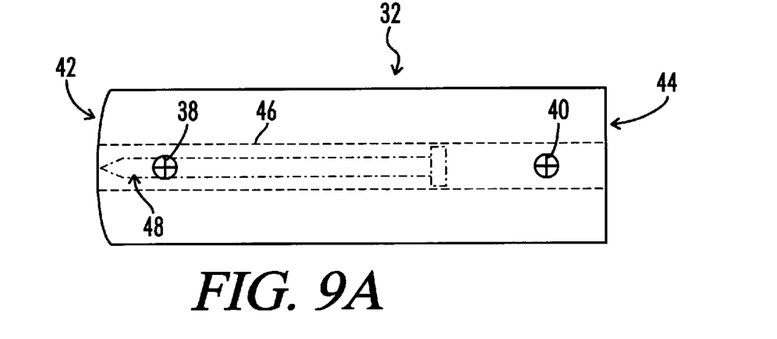
FIG. 9A is a side view of the tube with the spike shown (in phantom) in a retracted position.

With reference to FIG. 9A, the spike 48 (in phantom) is shown in a retracted position inside the tube 32. The spike 48 is held in place by at least one of the thumbscrews 38 and 40 while in the retracted position. This is accomplished by turning at least one of the thumbscrews 38 and 40 until it engages the spike 48. As shown in FIG. 8A, the spike 48 is contained within a semi-circular sleeve 46 formed along an interior wall of the tube 32.

The sleeve 46 forms a separate housing within the tube 32. The spike 48 is housed within the sleeve 46 to prevent the rod handle 102 and the spike 48 from engaging. FIG. 8A also illustrates the position of the thumbscrew 40 which is used to secure the spike 48 in the retracted position within the tube 32. The thumbscrew 40 is tightened against the spike 48, thus holding the spike 48 in place.

Figure 9B:
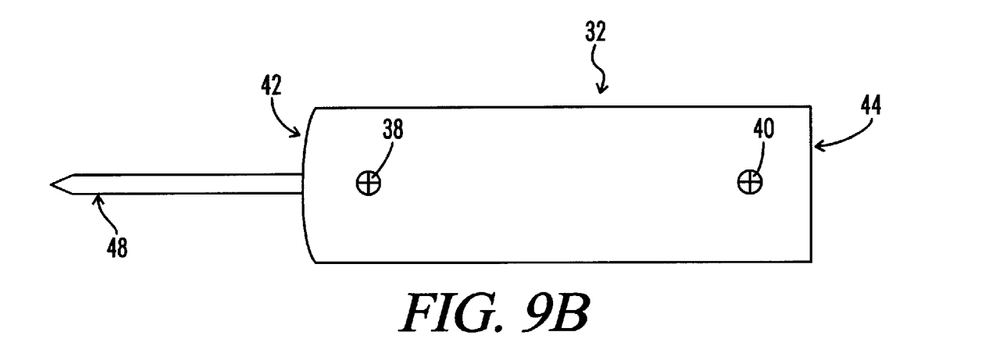
FIG. 9B is a side view of the tube portion with the spike extended.
Figure 9C:
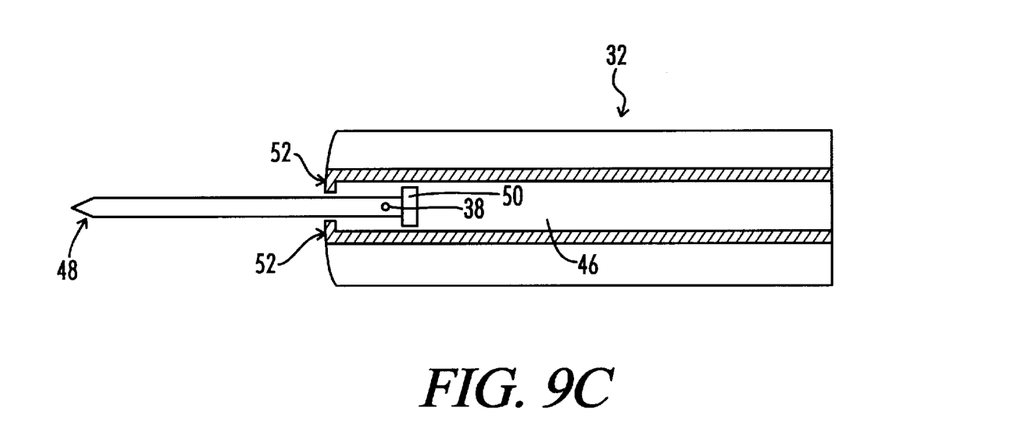
FIG. 9C is a cutaway view of the tube with the spike extended.

With reference to FIG. 9B, the spike 48 is shown in an extended position. The spike 48 extends from the tube end 42, which is the end opposite the end which receives the rod handle 102. To secure the spike 48 in this position, thumbscrew 38 is tightened against the spike 48. The spike 48 enables a user to anchor the rod 100 to the ground if necessary. The spike 48 also enables the user to fish with multiple rods if desired. In order to use the spike 48, the tube 32 is removed from the holster 10. Thumbscrew 40 which holds the spike 48 in the retracted position is loosened, allowing the spike 48 to be extended from the tube end 42. A spike stop 52, shown in FIG. 9C, engages the head 50 of the spike 48 when the spike 48 is extended to prevent the spike 48 from disengaging from the tube 32. The thumbscrew 38 can then be tightened to secure the spike 48 in its extended position. In this configuration, the spike 48 may be inserted into the ground to secure the tube 32 in place. The handle portion 102 of the rod 100 may then be inserted into the tube 32.

Figure 10:
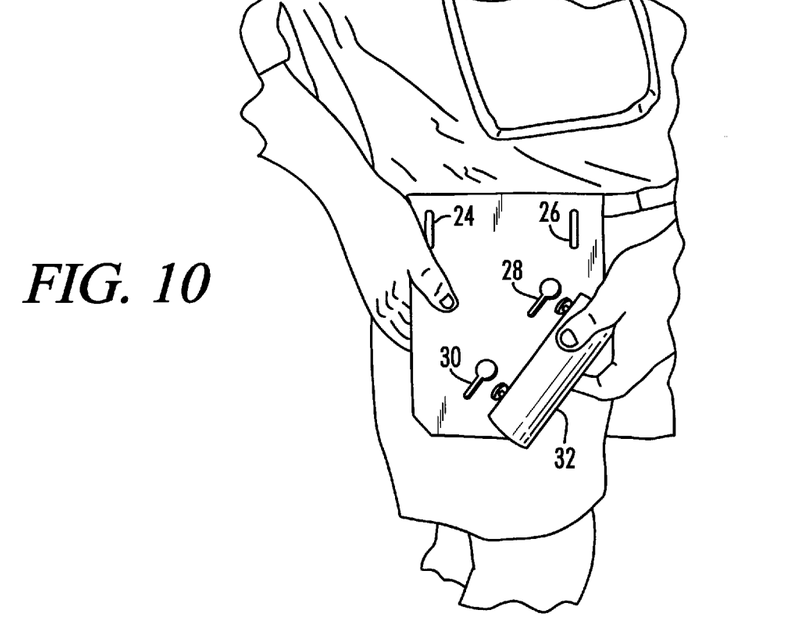
FIG. 10 is a perspective view showing a user attaching the tube portion to the hip plate.

With reference to FIG. 10, tube 32 is shown in position to be attached to the hip plate 12. The tube fasteners 34, 36 are aligned with the circular portions 27, 31 of the keyhole cutouts 28, 30. The fasteners 34, 36 are then inserted into the circular portions 27, 31 and moved down so that the tube 32 is secured to the hip plate 12.

Figure 11:
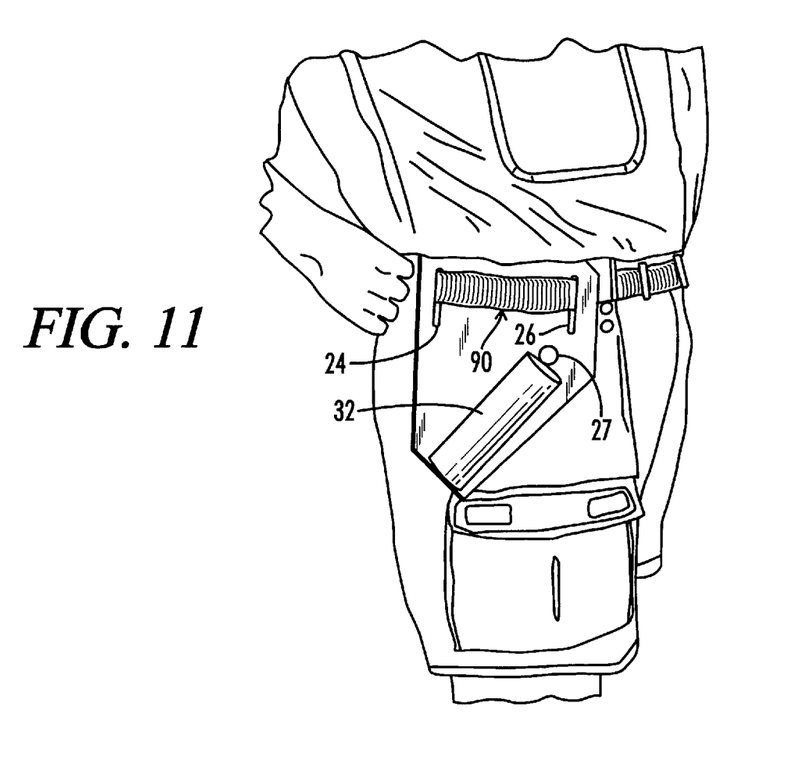
FIG. 11 is a perspective view of the holster of the present invention operably attached to the user's belt.

With reference to FIG. 11, the holster 10 of the present invention is shown operably attached to the right side of the user. The handle 102 of the user's fishing rod 100 may be inserted into the tube 32 in accordance with the present invention. Alternatively, the tube 32 may be detached from the hip plate 12 and anchored to the ground by the spike 48.

Thus, although there have been described particular embodiments of the present invention of a new and useful Fishing Rod Holster, it is not intended that such references be construed as limitations upon the scope of this invention except as set forth in the following claims.

What is claimed is:

1. A reversible fishing rod holster, comprising:

a hip plate having opposing sides and a front edge and configured for attachment to a belt to be worn about a user's body with said front edge extending in the direction the user is facing when the holster is being worn by the user;

a tube for receiving the handle end of a fishing rod, said tube having a longitudinal axis, a predetermined length and a longitudinal opening for receiving the handle end of a fishing rod said longitudinal opening being of substantially constant cross-section along said length when viewed perpendicular to said longitudinal axis;

attaching fasteners for attaching the tube to the hip plate so that the tube is selectively positionable on either side of the hip plate, thereby enabling the holster to be worn on either side of a user's body with the tube extending in a predetermined orientation relative to the front edge of the hip plate when the hip plate is on one side of the user's body, and extending in the same predetermined orientation relative to said front edge of the hip plate when the holster is worn on the opposite side of the user's body.

2. The holster of claim 1, wherein the attaching fasteners include:

at least one aperture formed in the hip plate, at least one fastener attached to the tube, wherein said at least one aperture is configured to cooperatively receive said at least one fastener attached to the tube.

3. The holster of claim 1, wherein the hip plate further comprises:

a pair of spaced apart elongated slots for receiving the belt to be worn about the user's body.

4. A reversible fishing rod holster, comprising:

a hip plate having opposing sides and a front edge and configured for attachment to a belt to be worn about a user's body with said front edge extending in the direction the user is facing when the holster is being worn by the user;

a tube for receiving the handle end of a fishing rod;

attaching fasteners for attaching the tube to the hip plate so that the tube is selectively positionable on either side of the hip plate, thereby enabling the holster to be worn on either side of a user's body with the tube extending in a predetermined orientation relative to the front edge of the hip plate when the hip plate is on one side of the user's body, and extending in the same predetermined orientation relative to said front edge of the hip plate when the holster is worn on the opposite side of the user's body, and further comprising:

a spike housed within the tube, and means for enabling said spike to be operable between a retracted position and an extended position whereby said tube is selectively anchored to a ground surface by removing said tube from said hip plate and extending said spike from said tube and driving said spike into a ground surface.

5. The holster of claim 2, further comprising:

a longitudinal bore formed in a wall of the tube to house the spike when in the retracted position.

6. The holster of claim 2, further comprising:

a longitudinal sleeve formed along an inner surface of the tube to house the spike when in the retracted position.

7. The holster of claim 2, further comprising:

means for securing the spike in either the retracted position or the extended position.

8. The holster of claim 7, wherein the securing means comprises:

an axial bore formed in the tube, at least one screw threadably received in said axial bore, wherein the at least one screw may be tightened to bear against the spike or loosened to enable the spike to be extended or retracted.

9. A reversible fishing rod holster, comprising:

a hip plate having opposing sides and a front edge and configured for attachment to a belt to be worn about a user's body with said front edge extending in the direction the user is facing when the holster is being worn by the user;

a tube for receiving the handle end of a fishing rod;

attaching fasteners for attaching the tube to the hip plate so that the tube is selectively positionable on either side of the hip plate, thereby enabling the holster to be worn on either side of a user's body with the tube extending in a predetermined orientation relative to the front edge of the hip plate when the hip plate is on one side of the user's body, and extending in the same predetermined orientation relative to said front edge of the hip plate when the holster is worn on the opposite side of the user's body, said attaching fasteners including at least one aperture formed in the hip plate, at least one fastener attached to the tube, wherein said at least on aperture is configured to cooperatively receive said at least on fastener attached to the tube; and wherein the attaching fasteners further include:

a second fastener attached to the tube, a slot in said hip plate, said slot having a plurality of notches for receiving said second fastener to enable the tube to be attached to the hip plate in any of a plurality of user selectable positions.

10. A reversible holster for a fishing rod, comprising:

a hip plate configured for attachment to a belt on a user, said hip plate having opposing sides;

a pipe shaped receptacle having a cylindrical cross-section for receiving the fishing rod;

means for removably attaching the pipe shaped receptacle to the hip plate to enable said pipe shaped receptacle to be attached to one side of the hip plate or removed and attached to the opposite side of the hip plate thereby enabling said holster to be positioned on the belt on either the right side or the left side of the user.

11. A reversible holster for a fishing rod, comprising:

a hip plate configured for attachment to a belt, said hip plate having opposing sides;

a pipe shaped receptacle for receiving the fishing rod;

means for removably attaching the pipe shaped receptacle to the hip plate to enable said pipe shaped receptacle to be attached to one side of the hip plate or removed and attached to the opposite side of the hip plate thereby enabling said holster to be positioned on either the right side or the left side of the user wearing the belt, wherein the attaching means further comprises:

at least one fastener attached to the pipe shaped receptacle, an aperture having a plurality of notches formed in the hip plate, wherein said plurality of notches is configured to selectively receive said at least one fastener attached to the pipe shaped receptacle to enable the pipe shaped receptacle to be attached to the hip plate in any of a plurality of user selectable positions.

12. The holster of claim 11, further comprising:

a spike housed within the pipe shaped receptacle,
wherein the spike is operable between a retracted position and an extended position to enable the pipe shaped receptacle to be anchored to a ground surface.

13. The holster of claim 12, wherein the spike is received in a longitudinal bore formed in a wall of the pipe shaped receptacle when in the retracted position.

14. The holster of claim 12, further including means for securing the spike within the pipe shaded receptacle wherein the means for securing the spike is integral with the means for attaching the pipe shaped receptacle to the hip plate.

15. A fishing rod holster, comprising:

a hip plate having means for attaching the plate to a belt;

a tube for receiving a fishing rod, said tube having spaced apart open ends and means for attaching the tube to the hip plate;

an elongated spike having a body and an enlarged head wherein the diameter of the head is greater than the diameter of the body of the spike;

a sleeve inside the tube having means for securing the spike in position;

wherein the spike is contained within the sleeve within the tube and is selectively slidably moved within the sleeve in a manner that permits the spike to be secured in a retracted position inside the tube or extended from the same;

wherein the sleeve member includes a stop means for preventing the spike from becoming disengaged from the sleeve.

16. The holster of claim 15, wherein the hip plate is constructed of a material selected from the group of materials consisting of plastic, leather or rubber.

17. The holster of claim 15, wherein the tube is constructed of a material selected from the group of materials consisting of plastic, rubber, metal, composites, leather or wood.

18. The holster of claim 15, wherein the means for securing the spike is integral with the means for attaching the tube to the hip plate.

19. The holster of claim 15, wherein the holster is reversible in a manner that allows the holster to be attached on either side of a user's body.

20. The holster of claim 15, wherein the tube is removably detachable from said hip plate, allowing for the removal of the tube and the extension of the spike for insertion into the ground.

* * * * *